United States Patent
Chen

(10) Patent No.: US 12,016,348 B2
(45) Date of Patent: Jun. 25, 2024

(54) PEARL DAIFUKU STRUCTURE AND MANUFACTURING METHOD THEREOF

(71) Applicant: SAN SHU GONG FOOD CO., LTD., New Taipei (TW)

(72) Inventor: Mei-Yao Chen, New Taipei (TW)

(73) Assignee: SAN SHU GONG FOOD CO., LTD., New Taipei (TW)

(*) Notice: Subject to any disclaimer, the term of this patent is extended or adjusted under 35 U.S.C. 154(b) by 0 days.

(21) Appl. No.: 18/354,650

(22) Filed: Jul. 19, 2023

(65) Prior Publication Data

US 2024/0065287 A1 Feb. 29, 2024

Related U.S. Application Data

(62) Division of application No. 17/898,434, filed on Aug. 29, 2022.

(51) Int. Cl.
*A23G 3/54* (2006.01)

(52) U.S. Cl.
CPC ........................................ *A23G 3/54* (2013.01)

(58) Field of Classification Search
None
See application file for complete search history.

(56) References Cited

FOREIGN PATENT DOCUMENTS

JP        02261345 A    * 10/1990

OTHER PUBLICATIONS

What's The Difference Between Mochi, Dango and Daifuku?—NPL article by Tensuke market; Apr. 26, 2018; obtained from https://www.tensuke.com/post/what-s-the-difference-between-mochi-dango-and-daifuku#:~: text=Daifuku%2C%20on%20the%20other%20hand,but%20other%20fillings%20may%20appear. (Year: 2018).*

* cited by examiner

*Primary Examiner* — Jyoti Chawla
(74) *Attorney, Agent, or Firm* — Leong C. Lei

(57) ABSTRACT

A method for manufacturing the pearl daifuku characterized in that the surface layer is formed by subjecting the mochi skin raw material to steps of stirring and steaming to be then shaped to form the mochi skin; the first internal layer is formed by subjecting the pearl raw material to steps of stirring and steaming so as to be shaped into the pearls; and the second internal layer and the first internal layer are subjected to stuffing and shaping so as to be wrapped with the surface layer to thereby form the pearl daifuku.

9 Claims, 5 Drawing Sheets

PEARL DAIFUKU STRUCTURE AND MANUFACTURING METHOD THEREOF

CROSS-REFERENCE TO RELATED APPLICATIONS

This is a divisional application of co-pending patent application Ser. No. 17/898,434, filed on Aug. 29, 2022.

TECHNICAL FIELD OF THE INVENTION

The present invention relates generally to a pearl daifuku structure and a manufacturing method thereof, and more particularly to a pearl daifuku structure, and a manufacturing thereof, that presents a new mouthfeel of both mochi and pearls to thereby make the mouthfeel of a daifuku unique and thus enhance the product value of the daifuku.

DESCRIPTION OF THE PRIOR ART

A known daifuku is a soft confection, as shown in FIG. 1, which comprises an outer layer 1 and a filling 2. The outer layer 1 is generally made of a soft sticky rice material and the outer layer 1 wraps around a single filling 2, which can be of various flavors, such as red bean, mung bean, chestnut, and strawberry. Such a traditional soft confection has been long kept for an existing flavor of one single filling 2. No significant breakthrough has been developed. Consequently, the consumers are only allowed to do purchasing by selecting a preferred single traditional flavor. This makes it impossible to enhance the product value of the daifuku dessert.

Recently, pearls (tapioca balls) are popular in Taiwan as a unique food and are commonly used in making of pearl milk tea drinks, or pearl based ice products or frozen desserts, which are popular both locally and globally, because such products or desserts presents not only the aromatic and sweetly flavor of tea products or ice desserts, but also the soft-chewy mouthfeel of the pearls. Such a combined flavor or taste has been only found in the pearl milk tea drinks and similar frozen desserts and has been regrettably not included in other food products. The present invention aims to provide a pearl daifuku structure, and also a manufacturing method thereof, which makes a daifuku exhibiting a combined flavor to present a new mouthfeel of both mochi and pearls.

SUMMARY OF THE INVENTION

The primary objective of the present invention is to provide a pearl daifuku structure and a manufacturing method thereof, in which pearls are used in combination with a sticky filling to allow a daifuku to exhibit a combined mouthfeel so as to present a unique taste of both mochi and pearl to thereby enhance the product value of the daifuku.

The pearl daifuku structure comprises, in sequence from center to outside, a first internal layer, a second internal layer wrapped around the first internal layer, and a surface layer wrapped around the second internal layer. The first internal layer is formed of one or more than one pearl having different flavors. The second internal layer comprises a sticky filling. The surface layer comprises a mochi skin formed of a mochi skin raw material and exhibiting a soft dense form, so that the daifuku exhibits a combined flavor and the combination of the pearls of the first internal layer and the filling of the second internal layer makes the daifuku, when eaten, presenting a new mouthfeel of both the mochi and the pearls.

The method for manufacturing the pearl daifuku is such that the surface layer is formed by subjecting the mochi skin raw material to steps of stirring and steaming to be then shaped to form the mochi skin; the first internal layer is formed by subjecting the pearl raw material to steps of stirring and steaming so as to be shaped into the pearls; and the second internal layer and the first internal layer are subjected to stuffing and shaping so as to be wrapped with the surface layer to thereby form the pearl daifuku.

In the above-described method for manufacturing the pearl daifuku, the mochi skin raw material of the surface layer comprises 10% water; 8.5% hydroxypropyl distarch phosphate; 0.065% potassium sorbate; 0.052% fatty acid glyceride; 0.025% xanthan gum; and 0.05% flavoring.

In the above-described method for manufacturing the pearl daifuku, the pearl raw material of the first internal layer comprises: 3.4% water; 2.83% hydroxypropyl distarch phosphate; 0.14% prepared mix powder; 0.056% brown sugar flavoring; 0.0008% caramel coloring; 0.008% fatty acid glyceride, and 0.008% potassium sorbate.

In the above-described method for manufacturing the pearl daifuku, the step of steaming the mochi skin raw material of the surface layer is to steam the mixed and stirred mochi skin raw material at a temperature around 100° C. for a time period of approximately 20 minutes for being fully cooked.

In the above-described method for manufacturing the pearl daifuku, the steaming of the pearls is to steam the mixed and stirred raw material at a temperature of around 100° C. for approximate 20 minutes for being fully cooked.

DETAILED DESCRIPTION OF THE PREFERRED EMBODIMENT

Figure 1:
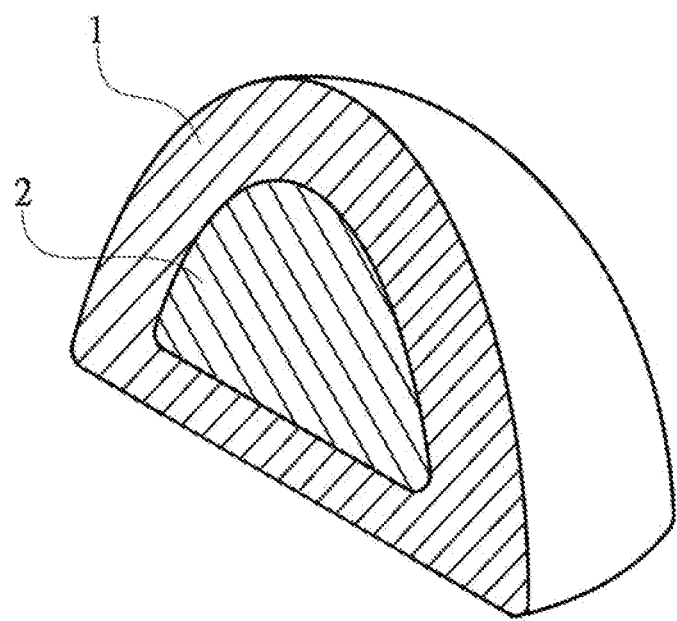
FIG. 1 is a perspective view, partly sectioned, showing a known daifuku.
Figure 2:
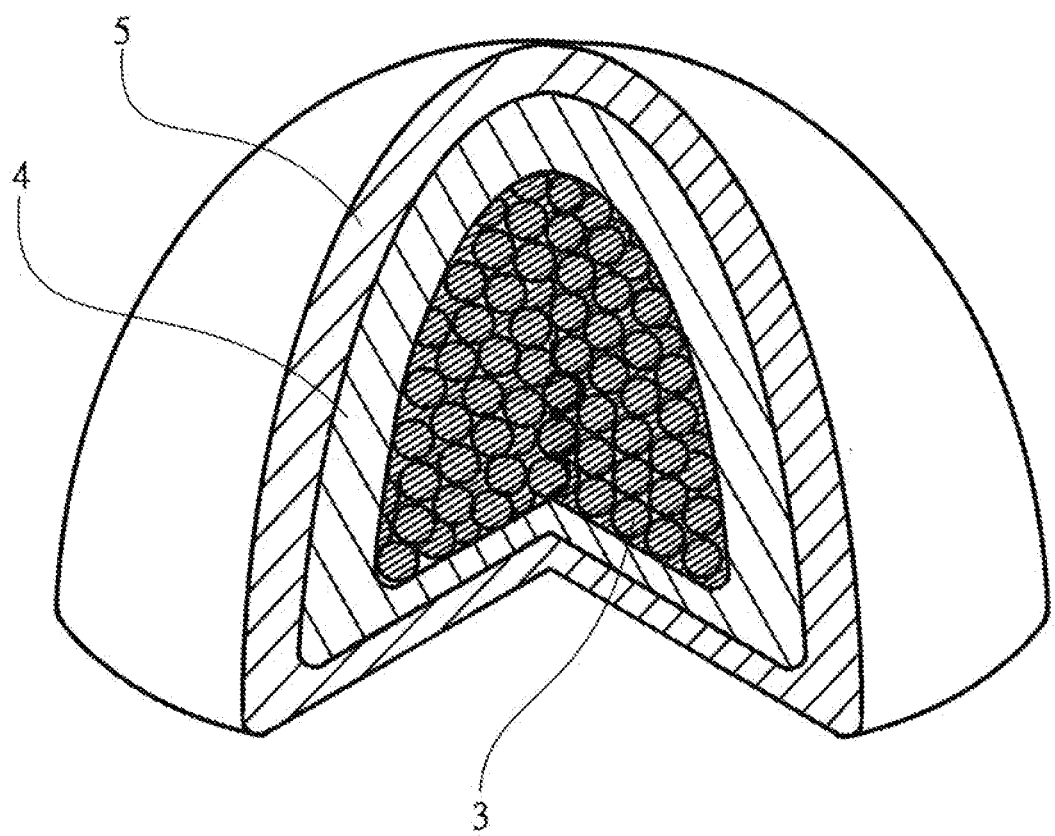
FIG. 2 is a perspective view, partly sectioned, showing a pearl daifuku according to the present invention.

Referring to FIG. 2, a partly sectioned view of a pearl daifuku according to the present invention is shown. As shown in the drawing, the pearl daifuku according to the present invention comprises, in sequence from center to outside, a first internal layer 3, a second internal layer 4 wrapped around the first internal layer 3, and a surface layer 5 wrapped around the second internal layer 4. The first internal layer 3 is formed of one or more than one pearl that is made in a spherical form and is made of different flavors. The second internal layer 4 is a sticky filling. The surface layer 5 is a mochi skin that is made in a soft and dense form. The second internal layer 4 is arranged, with a suitable thickness, wrapping around the first internal layer 3. The surface layer 5 is of a suitable thickness to wrap around the second internal layer 4. A daifuku so manufactured exhibits a combined flavor, and the pearls of the first internal layer 3 combined with the filling of the second internal layer 4 allows the daifuku to exhibit, when being eaten, a new mouthfeel involving both mochi and pearls.

Figure 3:
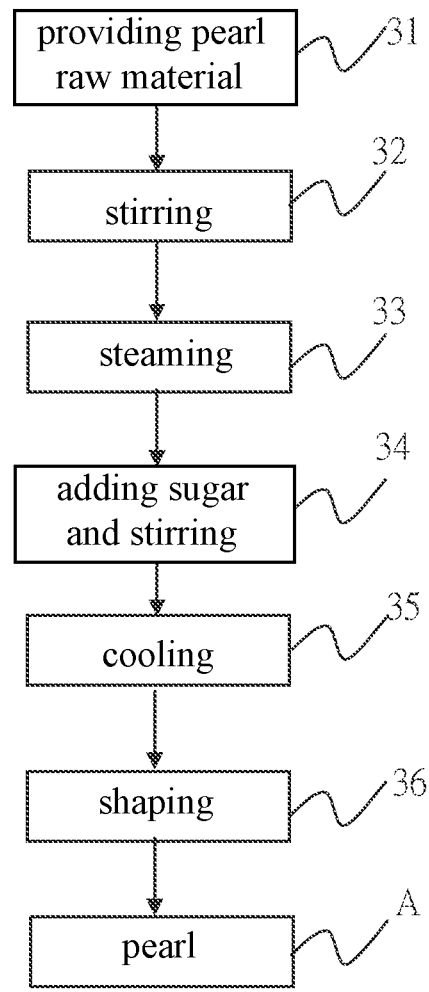
FIG. 3 is a flow chart showing a process for manufacturing pearls of a first internal layer of the present invention.

Referring to FIG. 3, a flow chart showing a process for manufacturing the first internal layer 3 according to the present invention is provided. As shown in the drawing, the process for manufacturing the pearls of the first internal layer 3 of the present invention comprises the following steps:

(1) providing pearl raw material 31, wherein the pearl raw material comprises: 3.4% water; 2.83% hydroxypropyl distarch phosphate; 0.14% prepared mix powder; 0.056% brown sugar flavoring; 0.0008% caramel coloring; 0.008% fatty acid glyceride, and 0.008% potassium sorbate.

(2) stirring 32, wherein a predetermined amount of the pearl raw material of Step 1 is mixed and stirred.

(3) steaming 33, wherein the mixed and stirred pearl raw material of Step 2 is steamed at a temperature of around 100° C. for approximately 20 minutes.

(4) adding sugar and stirring 34, wherein the steamed pearl raw material of Step 3 is added with 10.72% malt sugar and 2.83% granulated sugar and subject to uniform stirring.

(5) cooling 35, wherein a sugar-added and stirred semifinished product of Step 4 is placed in room temperature for cooling.

(6) shaping 36, wherein the cooled semifinished product is diced and shaped so as to form pearls A in a pellet form.

Figure 4:
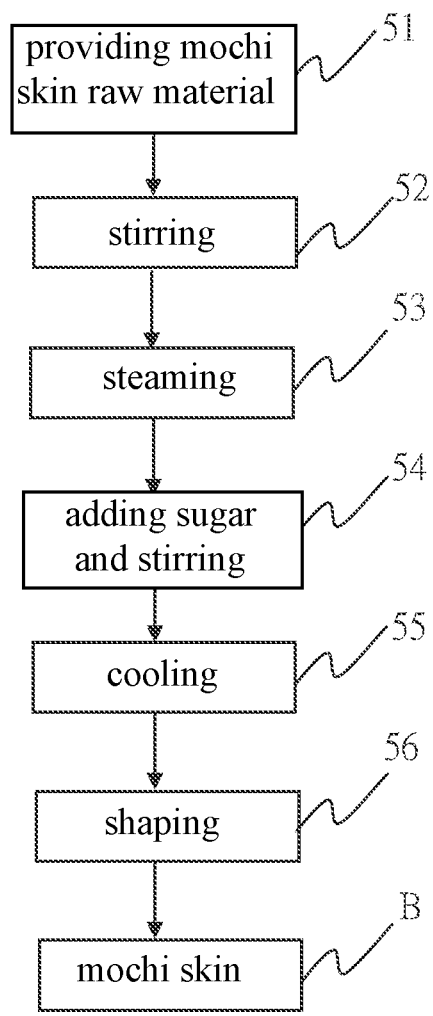
FIG. 4 is a flow chart showing a process for manufacturing a mochi skin of a surface layer of the present invention.

Referring to FIG. 4, a flow chart showing a process for manufacturing the surface layers 5 according to the present invention is provided. As shown in the drawing, the process for manufacturing a mochi skin of the surface layer 5 according to the present invention comprises the following steps:

(1) providing mochi skin raw material 51, wherein the mochi skin raw material comprises: 10% water; 8.5% hydroxypropyl distarch phosphate; 0.065% potassium sorbate; 0.052% fatty acid glyceride; 0.025% xanthan gum; and 0.05% flavoring.

(2) stirring 52, wherein a predetermined amount of the mochi skin raw material of Step 1 is mixed and stirred.

(3) steaming 53, wherein the mixed and stirred mochi skin raw material of Step 2 is steamed at a temperature of around 100° C. for approximately 20 minutes.

(4) adding sugar and stirring 54, wherein the steamed mochi skin raw material of Step 3 is added with 39% malt sugar and 8% granulated sugar and uniformly stirred.

(5) cooling 55, wherein a sugar-added and stirred mochi skin semifinished product of Step 4 is placed in room temperature for cooling.

(6) shaping 56, wherein the cooled semifinished product is shaped so as to form a mochi skin B.

Figure 5:
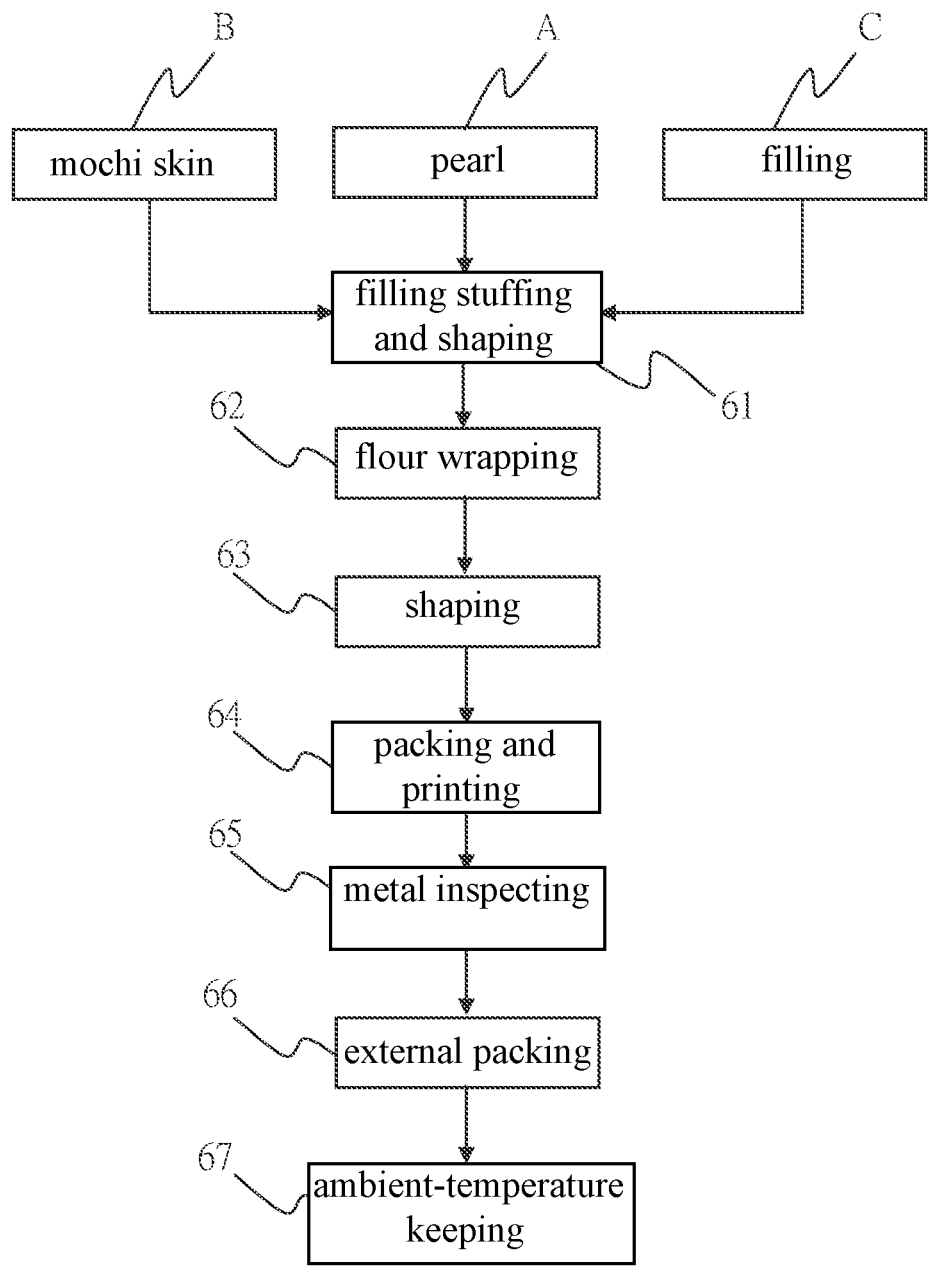
FIG. 5 is a flow chart showing a process for manufacturing a pearl daifuku according to the present invention.

Referring to FIG. 5, a flow chart showing a process for manufacturing a pearl daifuku according to the present invention is provided. As shown in the drawing, the process for manufacturing a pearl daifuku according to the present invention comprises the following steps:

(1) filling stuffing and shaping 61, wherein the pearls A of the first internal layer 3 and the second internal layer 4 are stuffed into the mochi skin B of the surface layer 5, wherein the second internal layer 4 is a filling C that is formed of 13.33% bean paste, milk tea, or strawberry jam.

(2) flour wrapping 62, wherein a stuffed and shaped pearl daifuku semifinished product of Step 1 is wrapped with 1% potato flour.

(3) shaping 63, wherein the pearl daifuku semifinished product of Step 2 is shaped in a ball or drop form.

(4) packing and printing 64, wherein the pearl daifuku of Step 2 is packed, and product illustration and marking are printed.

(5) metal inspecting 65, wherein equipment is applied to inspect whether or not a product of the pearl daifuku contains a metallic ingredient.

(6) external packing 66, wherein a predetermined quantity of the pearl daifuku are collected and packed.

(7) ambient-temperature keeping 67, wherein the packing-completed pearl daifukus are kept in an ambient temperature for being ready to shipping.

In summary, the present invention provides a pearl daifuku structure, and a manufacturing method thereof, which comprises a first internal layer formed of one or plural pearls having different flavors, combined with a second internal layer formed of a sticky filling, and a surface layer formed of a mochi skin raw material. The pearls combined with the sticky filling makes the daifuku exhibiting a combined mouthfeel and presenting, when being eaten, a new taste of both the mochi and the pearls, so as to enhance the product value of the daifuku, this being a practical design and innovated creation.

I claim:

1. A pearl daifuku manufacturing method, comprising the following steps:
   providing a predetermined amount of pearl raw material, which is mixed and stirred, and is steamed;
   adding sugar to the steamed pearl raw material and uniformly stirring, and then placing a sugar-added and stirred semifinished product in room temperature for cooling;
   dicing and shaping the cooled semifinished product to form pearls in a pellet form;
   providing a predetermined amount of mochi skin raw material, which is mixed and stirred, and is steamed;
   adding sugar to the steamed mochi skin raw material and uniformly stirring, and placing a sugar-added and stirred semifinished product of in room temperature for cooling;
   shaping the cooled semifinished product into a mochi skin; and
   stuffing the pearls and a filling in the mochi skin for shaping into a pearl daifuku, and subjecting the pearl daifuku to flour wrapping and shape fixing.

2. The pearl daifuku manufacturing method according to claim 1, wherein the pearl raw material comprises: 3.4% water; 2.83% hydroxypropyl distarch phosphate; 0.14% prepared mix powder; 0.056% brown sugar flavoring; 0.0008% caramel coloring; 0.008% fatty acid glyceride, and 0.008% potassium sorbate.

3. The pearl daifuku manufacturing method according to claim 1, wherein the pearl raw material is steamed at a temperature around 100° C. for a time period of approximately 20 minutes.

4. The pearl daifuku manufacturing method according to claim 1, wherein the steaming pearl raw material is added with 10.72% malt sugar and 2.83% granulated sugar, and is uniformly stirred.

5. The pearl daifuku manufacturing method according to claim 1, wherein the mochi skin raw material comprises: 10% water; 8.5% hydroxypropyl distarch phosphate;

0.065% potassium sorbate; 0.052% fatty acid glyceride; 0.025% xanthan gum; and 0.05% flavoring.

6. The pearl daifuku manufacturing method according to claim 1, wherein the mochi skin raw material is steamed at a temperature of around 100° C. for a time period of approximately 20 minutes.

7. The pearl daifuku manufacturing method according to claim 1, wherein the steamed mochi skin raw material is added with 39% malt sugar and 8% granulated sugar, and is uniformly stirred.

8. The pearl daifuku manufacturing method according to claim 1, wherein the filling comprises 13.33% bean paste, milk tea, or strawberry jam.

9. The pearl daifuku manufacturing method according to claim 1, wherein the shaped pearl daifuku is wrapped with 1% potato flour.

\* \* \* \* \*